(12) United States Patent
Kim (10) Patent No.: US 11,279,197 B2
(45) Date of Patent: Mar. 22, 2022

(54) AIR SUSPENSION SYSTEM FOR VEHICLES AND METHOD OF CONTROLLING THE SAME

(71) Applicant: HYUNDAI MOBIS CO., LTD., Seoul (KR)

(72) Inventor: Dong Kyu Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 288 days.

(21) Appl. No.: 16/695,553

(22) Filed: Nov. 26, 2019

(65) Prior Publication Data
US 2020/0164713 A1 May 28, 2020

(30) Foreign Application Priority Data
Nov. 27, 2018 (KR) .................. 10-2018-0148392

(51) Int. Cl.
| | |
|---|---|
| B60G 17/016 | (2006.01) |
| B60G 17/052 | (2006.01) |
| B60G 17/015 | (2006.01) |
| B60W 40/112 | (2012.01) |
| B60W 40/105 | (2012.01) |

(52) U.S. Cl.
CPC ....... B60G 17/0525 (2013.01); B60G 17/016 (2013.01); B60G 17/0155 (2013.01); B60W 40/105 (2013.01); B60W 40/112 (2013.01)

(58) Field of Classification Search
CPC ............ B60G 17/0525; B60G 17/0155; B60G 17/016; B60W 40/105; B60W 40/112
USPC ......... 280/5.514, 124.157, 124.158, 124.159
See application file for complete search history.

(56) References Cited

U.S. PATENT DOCUMENTS

| | | | | |
|---|---|---|---|---|
| 3,836,166 A | * | 9/1974 | Bainbridge ...... | B60G 17/01925 280/5.508 |
| 5,161,579 A | * | 11/1992 | Anderson, Jr. .... | B60G 17/0525 137/627.5 |
| 5,344,189 A | * | 9/1994 | Tanaka ................ | B60G 17/017 280/124.159 |
| 7,287,760 B1 | * | 10/2007 | Quick .................... | B60G 17/08 280/5.507 |
| 2009/0134595 A1 | * | 5/2009 | Haller ................ | B60G 17/0165 280/124.157 |
| 2018/0079273 A1 | * | 3/2018 | Ito ........................ | B60G 17/048 |
| 2019/0100070 A1 | * | 4/2019 | Ito ....................... | B60G 17/0525 |

* cited by examiner

Primary Examiner — Toan C To
(74) Attorney, Agent, or Firm — H.C. Park & Associates, PLC (57) ABSTRACT

An air suspension system and a method of controlling the same. The air suspension system includes air springs, each having a first input port, the air springs adjusting heights of left and right front and rear wheels, a data collection unit configured to receive data regarding a vehicle state, a solenoid valve configured to control the flow of compressed air, a double-acting cylinder whose piston rod is moved to guide the flow of the compressed air in left and right directions, so that the compressed air is supplied to the air springs through the solenoid valves connected to left and right sides of the double-acting cylinder, a drive unit having a drive motor to move the piston rod, and a sub-control unit configured to set a driving position and driving acceleration, based on the vehicle state, and to operate the solenoid valve and the drive unit.

13 Claims, 7 Drawing Sheets

AIR SUSPENSION SYSTEM FOR VEHICLES AND METHOD OF CONTROLLING THE SAME

CROSS-REFERENCE TO RELATED APPLICATION

This application claims priority from and the benefit of Korean Patent Application No. 10-2018-0148392, filed on Nov. 27, 2018 which is hereby incorporated by reference for all purposes as if set forth herein.

BACKGROUND

Field

Exemplary embodiments relate to an air suspension system for vehicles and a method of controlling the same, and more particularly, to an air suspension system capable of improving a roll suppression effect by adding, to a main hydraulic unit, a sub-hydraulic unit which interlocks with a control operation of the main hydraulic unit or electrically regulates a pressure of an air spring in a roll moment situation independently of the main hydraulic unit to enhance responsiveness thereof, and a method of controlling the same.

Discussion of the Background

In general, a suspension is limited in satisfying both riding comfort and steering stability at the same time. Increasing the riding comfort decreases the steering stability, whereas increasing the steering stability decreases the riding comfort.

The reason for this is as follows. Softening the spring of the suspension makes it easy to absorb shocks from rough roads to result in improvement in riding comfort, but makes a vehicle body unstable to cause deterioration in steering stability. On the other hand, hardening the spring results in improvement in steering stability, but causes deterioration in riding comfort because it does not properly absorb shocks transmitted from roughness of roads.

However, the strength of the conventional coil spring made of steel may not be changed optionally. For this reason, an air spring using air is produced. The air spring may become hard or soft as needed by easily controlling air pressure. The suspension using such an air spring is an air suspension.

In a conventional air suspension system, a vehicle height is raised by means of the air in an air tank, which is compressed by a compressor, or the compressor and the atmospheric pressure, whereas it is lowered by operating an exhaust valve.

In a process of controlling an air spring by each independent solenoid valve, it is necessary to perform exhaust to decrease one-side pressure of the air spring and to perform pressurization to increase the other-side pressure of the air spring. However, due to the characteristics of a pneumatic circuit, the time required to reach a desired vehicle height value is consequentially limited by the compressor and the air tank even if the valve is turned on/off fast.

However, since high-speed rotation or slalom rolls occur in a short situation, quick responsiveness is required to improve riding comfort.

Some vehicles use a stabilizer bar to suppress rolls in the air suspension, but the stabilizer bar, due to the characteristics thereof, makes riding comfort hard and causes deterioration in shock absorbing capability which is the role of the suspension.

The above information disclosed in this Background section is only for enhancement of understanding of the background of the invention and, therefore, it may contain information that does not constitute prior art.

SUMMARY

Exemplary embodiments of the present invention provide an air suspension system capable of improving a roll suppression effect by adding, to a main hydraulic unit, a sub-hydraulic unit, which interlocks with a control operation of the main hydraulic unit or electrically regulates a pressure of an air spring in a roll moment situation independently of the main hydraulic unit to enhance responsiveness thereof, and a method of controlling the same.

Additional features of the invention will be set forth in the description which follows, and in part will be apparent from the description, or may be learned by practice of the invention.

In an embodiment, there is provided an air suspension system that includes air springs, each having a first input port connected to a main hydraulic unit configured to regulate a flow of compressed air and adjust a vehicle height according to a roll situation of a vehicle, the air springs adjusting heights of left and right front and rear wheels of the vehicle based on the compressed air, a data collection unit configured to collect a vehicle state from a vehicle controller, a solenoid valve configured to control the flow of the compressed air additionally introduced into a second input port of each of the air springs, a double-acting cylinder whose piston rod is bilaterally moved to guide the flow of the compressed air in left and right directions, so that the compressed air is individually supplied to the left and right air springs through the solenoid valves connected to respective left and right sides of the double-acting cylinder, a drive unit having a drive motor to bilaterally move the piston rod, and a sub-control unit configured to determine a roll moment situation and set a driving position and driving acceleration, based on the vehicle state collected by the data collection unit, and to operate the solenoid valve and the drive unit.

Each of the air springs may be a two-chamber air spring having the first and second input ports.

The vehicle state may include at least one of a steering angle, a vehicle speed, a roll angle, a roll moment, and a difference in vehicle left and right heights.

The data collection unit may further collect an air spring actuation signal from a main control unit, and the sub-control unit may operate the solenoid valve and the drive unit according to at least one of the air spring actuation signal and vehicle state collected by the data collection unit.

The drive motor of the drive unit may be connected to the piston rod in a rack-pinion manner.

The double-acting cylinder may include a first double-acting cylinder configured to supply the compressed air to first and second solenoid valves that control the compressed air additionally introduced to first and second air springs installed to the respective left and right front wheels, and a second double-acting cylinder configured to supply the compressed air to third and fourth solenoid valves that control the compressed air additionally introduced to third and fourth air springs installed to the respective left and right rear wheels.

The first double-acting cylinder may include a first left line through which the compressed air discharged in the left direction by left movement of a first piston rod is supplied to the first solenoid valve installed to the left front wheel, and a first right line through which the compressed air discharged in the right direction by right movement of the first piston rod is supplied to the second solenoid valve installed to the right front wheel.

The second double-acting cylinder may include a second left line through which the compressed air discharged in the left direction by left movement of a second piston rod is supplied to the third solenoid valve installed to the left rear wheel, and a second right line through which the compressed air discharged in the right direction by right movement of the second piston rod is supplied to the fourth solenoid valve installed to the right rear wheel.

The solenoid valve may be a normally closed valve.

In an embodiment, there is provided a method of controlling an air suspension system, which includes receiving, by a sub-control unit, at least one of an air spring actuation signal collected from a main control unit and a vehicle state collected from a vehicle controller through a data collection unit, operating, by the sub-control unit, a solenoid valve to control a flow of compressed air additionally introduced into each of air springs installed to respective left and right front and rear wheels of a vehicle according to at least one of the air spring actuation signal and the vehicle state, and operating, by the sub-control unit, a drive unit after operating the solenoid valve, so that the drive unit bilaterally moves a piston rod to guide the flow of compressed air in left and right directions in a double-acting cylinder and supply the compressed air to the solenoid valve.

In the operating, by the sub-control unit, a solenoid valve, the sub-control unit may open the closed solenoid valve in response to the air spring actuation signal.

The vehicle state may include at least one of a steering angle, a vehicle speed, a roll angle, a roll moment, and a difference in vehicle left and right heights.

In the operating, by the sub-control unit, a drive unit, the sub-control unit may operate the drive unit by setting a driving position and driving acceleration according to the vehicle state.

As apparent from the above description, in the air suspension system and the method of controlling the same according to the embodiments of the present invention, it is possible to improve a roll suppression effect and control a sudden instantaneous change by adding, to the main hydraulic unit, the sub-hydraulic unit, which interlocks with the control operation of the main hydraulic unit or electrically regulates the pressure of the air spring in a roll moment situation independently of the main hydraulic unit to enhance responsiveness thereof. Thus, it is possible not only to improve the steering stability and riding comfort of the vehicle but also to distribute the operating load by the main hydraulic unit and the sub-hydraulic unit, thereby extending the operating range of the air suspension system.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure thorough, and will fully convey the scope of the invention to those skilled in the art. Like reference numerals in the drawings denote like elements.

Various advantages and features of the present invention and methods accomplishing thereof will become apparent from the following description of embodiments with reference to the accompanying drawings. However, the present invention is not be limited to the embodiments set forth herein but may be implemented in many different forms. The present embodiments may be provided so that the disclosure of the present invention will be complete, and will fully convey the scope of the invention to those skilled in the art and therefore the present invention will be defined within the scope of claims. Like reference numerals throughout the description denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereinafter, an air suspension system and a method of controlling the same according to the present invention will be described with reference to the accompanying drawings. It should be noted that the drawings are not necessarily to scale and may be exaggerated in thickness of lines or sizes of components for clarity and convenience of description. Furthermore, the terms as used herein are terms defined in consideration of functions of the invention and may change depending on the intention or practice of a user or an operator. Therefore, these terms should be defined based on the overall disclosures set forth herein.

Figure 1:
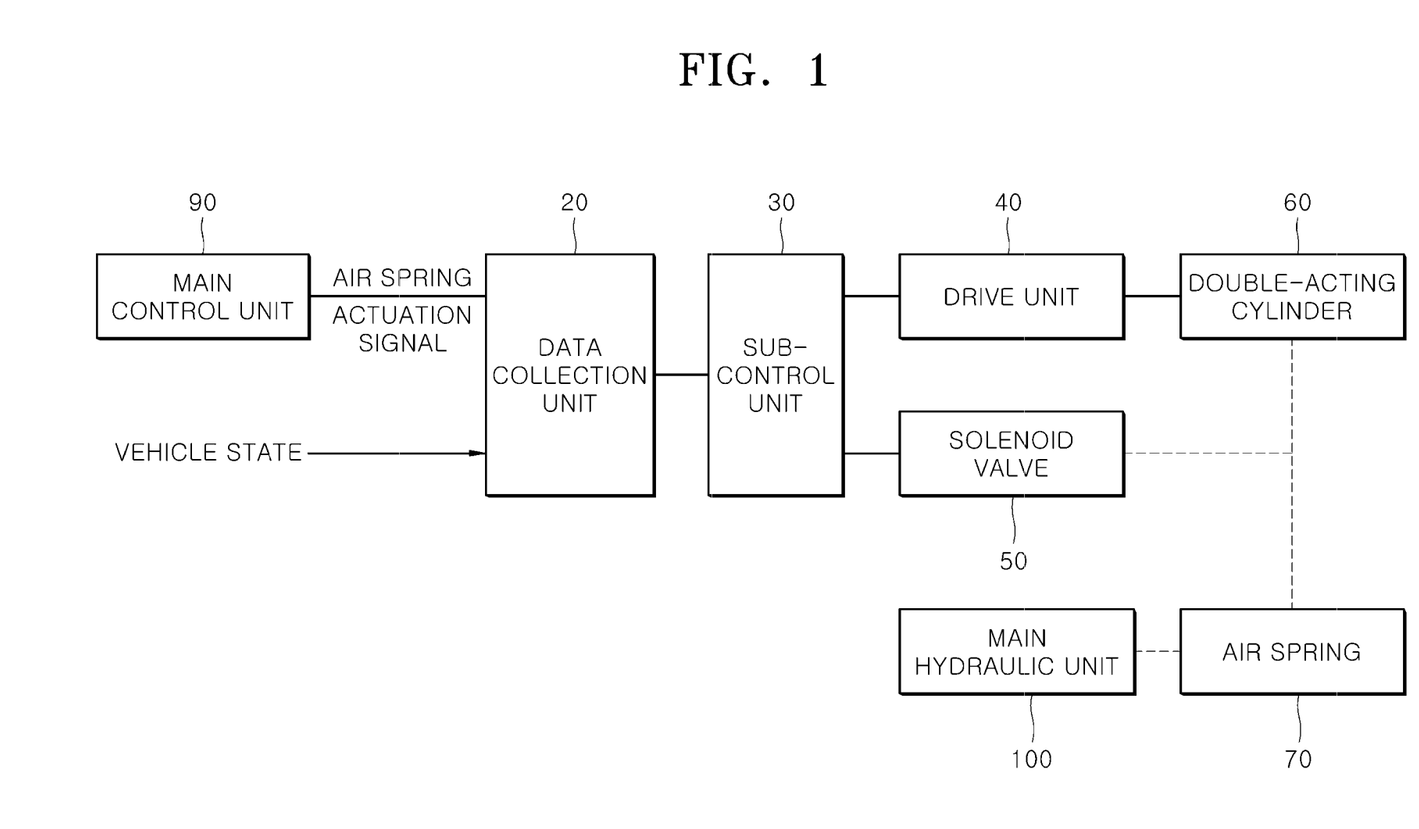
FIG. 1 is a block diagram illustrating an air suspension system according to an embodiment of the present invention.
Figure 2:
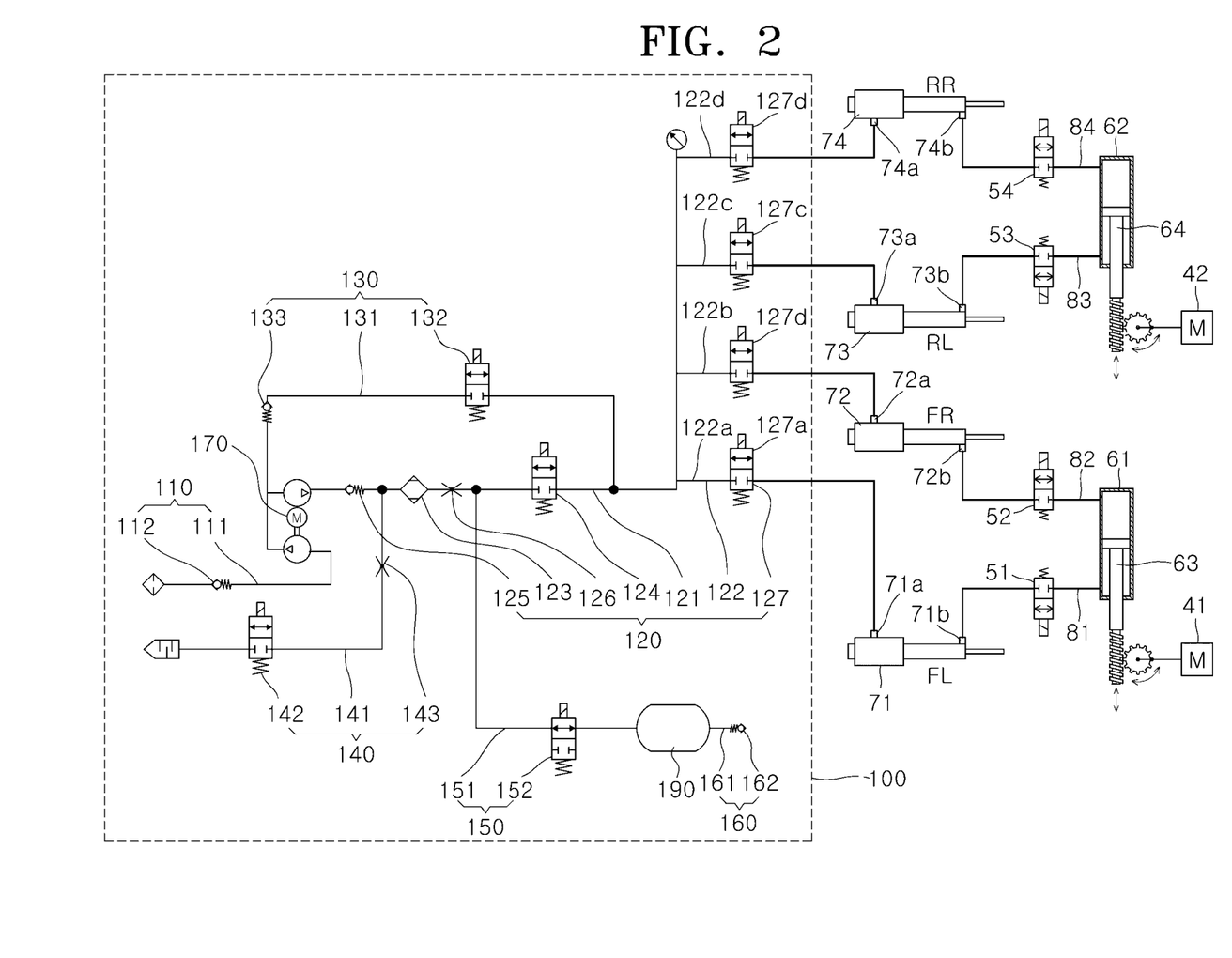
FIG. 2 is a diagram illustrating, in more detail, the air suspension system according to the embodiment of the present invention.

FIG. 1 is a block diagram illustrating an air suspension system according to an embodiment of the present invention. FIG. 2 is a diagram illustrating, in more detail, the air suspension system according to the embodiment of the present invention.

As illustrated in FIGS. 1 and 2, the air suspension system includes a main hydraulic unit 100, an air spring 70, a data collection unit 20, a solenoid valve 50, a double-acting cylinder 60, a drive unit 40, and a sub-control unit 30.

The main hydraulic unit 100 includes a first flow path 110, a second flow path 120, a third flow path 130, a fourth flow path 140, a fifth flow path 150, and a sixth flow path 160. The main hydraulic unit 100 may adjust a height of a vehicle body by air pressure.

The first flow path 110 connects outside air to a compressor 170. The compressor 170 is a device for generating air pressure by driving a motor, and may include a single-stage cylinder to generate air pressure or include a single-stage cylinder and a two-stage cylinder to generate multi-stage air pressure.

The second flow path 120 connects the compressor 170 to the air spring 70. The air spring 70 consists of first to fourth air springs 71 to 74 that are mounted to lower arms connected to respective left and right front and rear wheels of the vehicle, and supports the vehicle body at the upper end thereof to absorb shocks. Here, the air spring 70 is a two-chamber air spring having two input ports, and may be adjusted in height by air pressure to adjust a vehicle height.

The third flow path 130 connects the compressor 170 to the second flow path 120, the fourth flow path 140 connects outside air to the second flow path 120, and the fifth flow path 150 connects a storage tank 190 to the second flow path 120. The sixth flow path 160 is connected to the storage tank 190 for supply of air pressure.

The first flow path 110 includes a first pneumatic pipe 111 and a first check valve 112. The first flow path 110 may guide a fluid so that outside air is supplied to the compressor 170 when the compressor 170 is driven.

The first pneumatic pipe 111 connects outside air to the compressor 170. The first check valve 112 is formed in the first pneumatic pipe 111 to allow a one-way pneumatic flow. For example, the first check valve 112 may allow a pneumatic flow so that outside air reaches the compressor 170, and may block the discharge of air pressure from the compressor 170 to the outside.

The second flow path 120 includes a second pneumatic pipe 121, a second branch pipe 122, a second dryer 123, a second valve 124, a second check valve 125, and a second regenerator 126. The second flow path 120 may guide the fluid compressed by the compressor 170 and guide the flow of the fluid for adjustment of the vehicle height.

The second pneumatic pipe 121 is connected, at one end thereof, to the compressor 170. The second branch pipe 122 consists of a plurality of second branch pipes 122a, 122b, 122c, and 122d branched from the second pneumatic pipe 121 to be connected to the respective first to fourth air springs 71 to 74. The second branch pipes 122a, 122b, 122c, and 122d are formed with second spring valves 127a, 127b, 127c, and 127d that open and close the second branch pipes 122a, 122b, 122c, and 122d. The second spring valves 127a, 127b, 127c, and 127d may be solenoid valves that open and close the second branch pipes 122a, 122b, 122c, and 122d depending on whether or not electric power is supplied thereto.

The second dryer 123 is formed in the second pneumatic pipe 121 to dry the fluid passing through the second pneumatic pipe 121. For example, the second dryer 123 may filter out moisture from the fluid passing through the second pneumatic pipe 121.

The second valve 124 is formed in the second pneumatic pipe 121 to open and close the second pneumatic pipe 121. The second valve 124 may be a solenoid valve that opens and closes the second pneumatic pipe 121 depending on whether or not electric power is supplied thereto.

The second check valve 125 is formed in the second pneumatic pipe 121. In more detail, the second check valve 125 is disposed in the second pneumatic pipe 121 positioned between the compressor 170 and the second dryer 123 to allow a one-way pneumatic flow. For example, the second check valve 125 may allow a pneumatic flow so that the air compressed by the compressor 170 reaches the second dryer 123, and may block the flow of air from the second dryer 123 to the compressor 170.

The second regenerator 126 is formed in the second pneumatic pipe 121. In more detail, the second regenerator 126 is disposed in the second pneumatic pipe 121 positioned between the second dryer 123 and the second valve 124. For example, the second regenerator 126 may be an orifice, with the consequence that a fluid may be compressed and increased in temperature while passing through the second regenerator 126 by the Bernoulli principle. The second regenerator 126 may be used to remove moisture from the second dryer 123.

The third flow path 130 includes a third pneumatic pipe 131, a third valve 132, and a third check valve 133. The third flow path 130 may guide a fluid flow when the vehicle height is lowered.

One end of the third pneumatic pipe 131 is connected to the compressor 170, and the other end of the third pneumatic pipe 131 is connected to the second pneumatic pipe 121. In more detail, the third pneumatic pipe 131 is connected to the second pneumatic pipe 121 positioned between the second valve 124 and the second branch pipe 122.

The third valve 132 is formed in the third pneumatic pipe 131 to open and close the third pneumatic pipe 131. The third valve 132 may be a solenoid valve that opens and closes the third pneumatic pipe 131 depending on whether or not electric power is supplied thereto.

The third check valve 133 is formed in the third pneumatic pipe 131. In more detail, the third check valve 133 is disposed between the compressor 170 and the third valve 132 to allow a one-way pneumatic flow. For example, the third check valve 133 may block the air compressed by the compressor 170 from flowing to the third valve 132, and may allow the air having passed through the third valve 132 to flow to the compressor 170.

The fourth flow path 140 includes a fourth pneumatic pipe 141, a fourth valve 142, and a fourth regenerator 143. The fourth flow path 140 may be a passage for discharging the fluid in the main hydraulic unit 100 to the outside.

The fourth pneumatic pipe 141 is connected to the second pneumatic pipe 121. In more detail, the fourth pneumatic pipe 141 is connected, at one end thereof, to the second pneumatic pipe 121 positioned between the second dryer 123 and the second check valve 125. The fourth pneumatic pipe 141 may be connected, at the other end thereof, to outside air for discharge of fluid to the outside.

The fourth valve 142 is formed in the fourth pneumatic pipe 141 to open and close the fourth pneumatic pipe 141. The fourth valve 142 may be a solenoid valve that opens and closes the fourth pneumatic pipe 141 depending on whether or not electric power is supplied thereto.

The fourth regenerator 143 is formed in the fourth pneumatic pipe 141. In more detail, the fourth regenerator 143 is disposed in the fourth pneumatic pipe 141 positioned between the fourth valve 142 and the second pneumatic pipe 121. For example, the fourth regenerator 143 may be an orifice, with the consequence that a fluid may be compressed and increased in temperature while passing through the fourth regenerator 143 by the Bernoulli principle. The fourth regenerator 143 may be used to remove moisture from the second dryer 123.

The fifth flow path 150 includes a fifth pneumatic pipe 151 and a fifth valve 152. The fifth flow path 150 guides a fluid to flow to the storage tank 190.

One end of the fifth pneumatic pipe 151 is connected to the second pneumatic pipe 121, and the other end of the fifth pneumatic pipe 151 is connected to the storage tank 190. In more detail, the fifth pneumatic pipe 151 is connected to the second pneumatic pipe 121 positioned between the second regenerator 126 and the second valve 124.

The fifth valve 152 is formed in the fifth pneumatic pipe 151 to open and close the fifth pneumatic pipe 151. The fifth valve 152 may be a solenoid valve that opens and closes the fifth pneumatic pipe 151 depending on whether or not electric power is supplied thereto.

The sixth flow path 160 includes a sixth pneumatic pipe 161 and a sixth check valve 162. The sixth flow path 160 connects outside air to the storage tank 190 to supply the outside air to the storage tank 190.

The sixth pneumatic pipe 161 communicates with the outside and is connected to the storage tank 190. The sixth check valve 162 is formed in the sixth pneumatic pipe 161 to allow a one-way pneumatic flow. For example, the sixth check valve 162 may block the fluid stored in the storage tank 190 from flowing to the outside and may allow outside air to flow to the storage tank 190. An air injector may be detachably attached to the end of the sixth pneumatic pipe 161.

The air spring 70 is a two-chamber air spring having two input ports, and may consist of first to fourth air springs 71 to 74 that are installed to respective left and right front and rear wheels of the vehicle. The first to fourth air springs 71 to 74 may be connected, at first input ports 71a to 74a thereof, to the second branch pipes 122a, 122b, 122c, and 122d of the main hydraulic unit 100 for adjusting the flow of compressed air according to the roll situation of the vehicle, thereby adjusting the heights of the left and right front and rear wheels of the vehicle based on the compressed air.

The data collection unit 20 may collect an air spring actuation signal from the main control unit 90 for driving the main hydraulic unit 100 and a vehicle state from the vehicle controller to provide them to the sub-control unit 30.

Here, the air spring actuation signal collected from the main control unit 90 is generated to perform roll suppression by intervening in a roll situation occurring during steering in connection with an electric steering device based on the vehicle state input from the vehicle controller.

In addition, the vehicle state may include at least one of a steering angle, a vehicle speed, a roll angle, a roll moment, and a difference in vehicle left and right heights.

The solenoid valve 50 is a normally closed valve, and may consist of first to fourth solenoid valves 51 to 54 installed corresponding to the first to fourth air springs 71 to 74 so as to control the flow of compressed air additionally introduced into each of second input ports 71b to 74b of the first to fourth air springs 71 to 74.

The double-acting cylinder 60 may guide the flow of compressed air in left and right directions by bilateral movement of the piston rod thereof to supply the compressed air to each of the left and right air springs 70 through the solenoid valves 50 connected to the respective left and right of the double-acting cylinder 60.

The drive unit 40 may include a drive motor connected to the piston rod in a rack-pinion manner to bilaterally move the piston rod and adjust the inflow direction of the compressed air into the double-acting cylinder 60.

Here, the double-acting cylinder 60 may include a first double-acting cylinder 61 for adjusting left and right front wheels and a second double-acting cylinder 62 for adjusting left and right rear wheels, as illustrated in FIG. 2.

The first double-acting cylinder 61 may supply the first solenoid valve 51, installed to the left front wheel, with the compressed air discharged in the left direction by left movement of a first piston rod 63 through a first left line 81 and supply the second solenoid valve 52, installed to the right front wheel, with the compressed air discharged in the right direction by right movement of the first piston rod 63 through a first right line 82, thereby additionally supplying the compressed air to each of the first and second air springs 71 and 72 installed to the respective left and right front wheels.

The second double-acting cylinder 62 may supply the third solenoid valve 53, installed to the left rear wheel, with the compressed air discharged in the left direction by left movement of a second piston rod 64 through a second left line 83 and supply the fourth solenoid valve 54, installed to the right rear wheel, with the compressed air discharged in the right direction by right movement of the second piston rod 64 through a second right line 84, thereby additionally supplying the compressed air to each of the third and fourth air springs 73 and 74 installed to the respective left and right rear wheels.

The sub-control unit 30 may operate the solenoid valve 50 and the drive unit 40 according to at least one of the air spring actuation signal and vehicle state collected by the data collection unit 20.

In this case, the sub-control unit 30 may operate the solenoid valve 50 and the drive unit 40 in response to the air spring actuation signal collected from the main control unit 90, thereby compensating for the slow responsiveness of the main hydraulic unit 100 due to the pneumatic characteristics thereof and controlling a sudden instantaneous change through the drive motors 41 and 42 of the drive unit 40.

In addition, the sub-control unit 30 may open the closed solenoid valve 50 only above a set roll moment, such as above an air spring actuation signal, thereby preventing a leakage of air by keeping the solenoid valve 50 closed in normal times.

Figure 3:
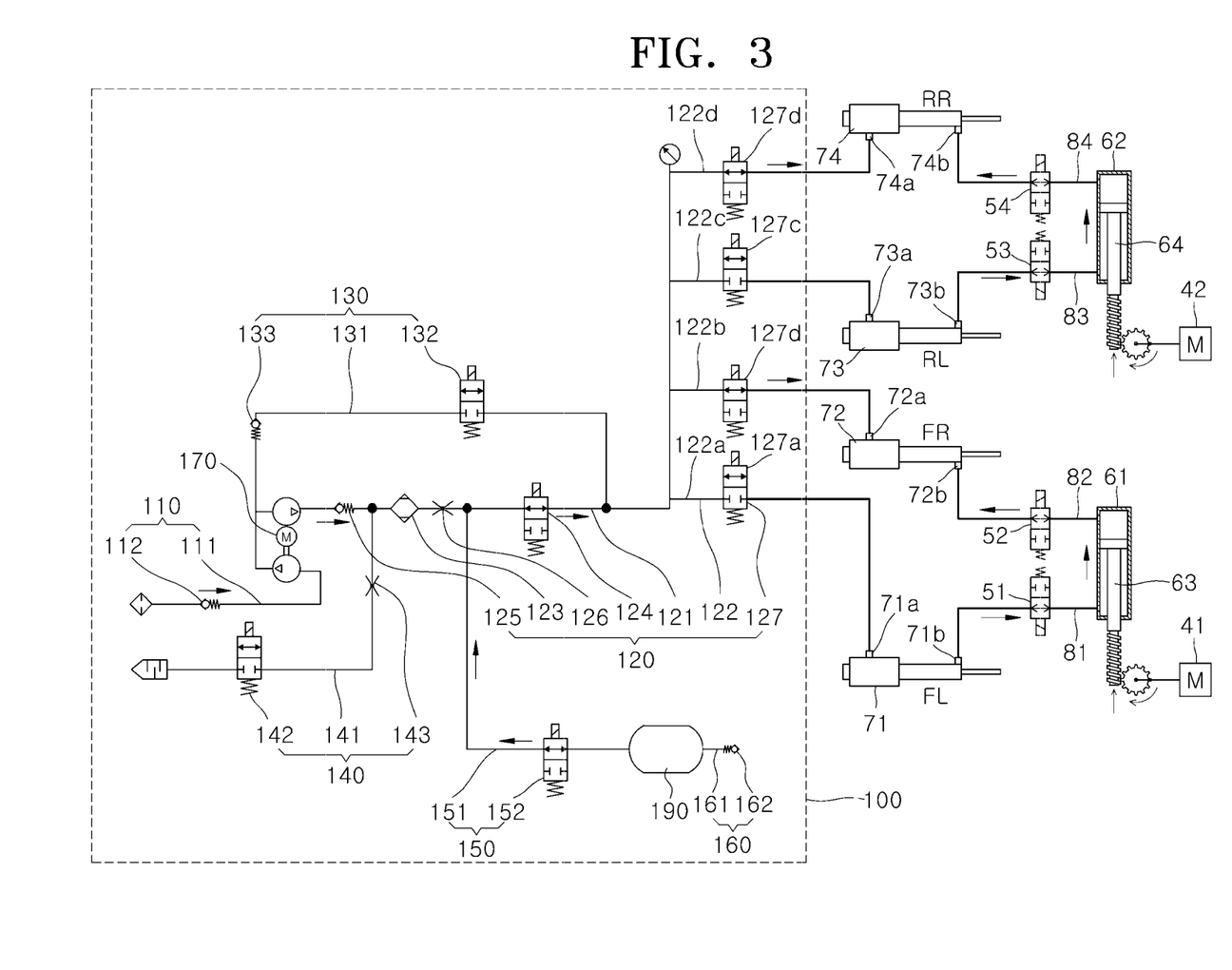
FIG. 3 is a diagram illustrating a state in which a right air spring is boosted in the air suspension system according to the embodiment of the present invention.

FIG. 3 is a diagram illustrating a state in which the right air spring is boosted in the air suspension system according to the embodiment of the present invention.

As illustrated in FIG. 3, an example will be described in which the pressure of air in the storage tank is used to boost the right air spring in the roll moment situation. The second valve 124 opens the second pneumatic pipe 121, the fifth valve 152 opens the fifth pneumatic pipe 151, and the second spring valves 127b and 127d open the second branch pipes 122b and 122d. In this state, the air stored in the storage tank 190 sequentially flows to the fifth pneumatic pipe 151, the second pneumatic pipe 121, and the second branch pipes 122b and 122d to reach the second and fourth air springs 72 and 74. In this case, the pressure of the air in each of the second and fourth air springs 72 and 74 is increased.

In the case where the compressor 170 is used, when the fifth valve 152 is closed and the compressor 170 is driven in the above state, outside air is supplied through the fourth pneumatic pipe 141 to the compressor 170 to be compressed therein so that the compressed air sequentially flows to the second branch pipes 122b and 122d to reach the second and fourth air springs 72 and 74.

In addition, by opening the first to fourth solenoid valves 51, 52, 53, and 54 and moving the first piston rod 63 of the first double-acting cylinder 61 and the second piston rod 64 of the second double-acting cylinder 62 in the right direction, the compressed air may be supplied to the second and fourth air springs 72 and 74 through the first right line 82 and the second right line 84, thereby enabling the second and fourth air springs 72 and 74 to be boosted.

Figure 4:
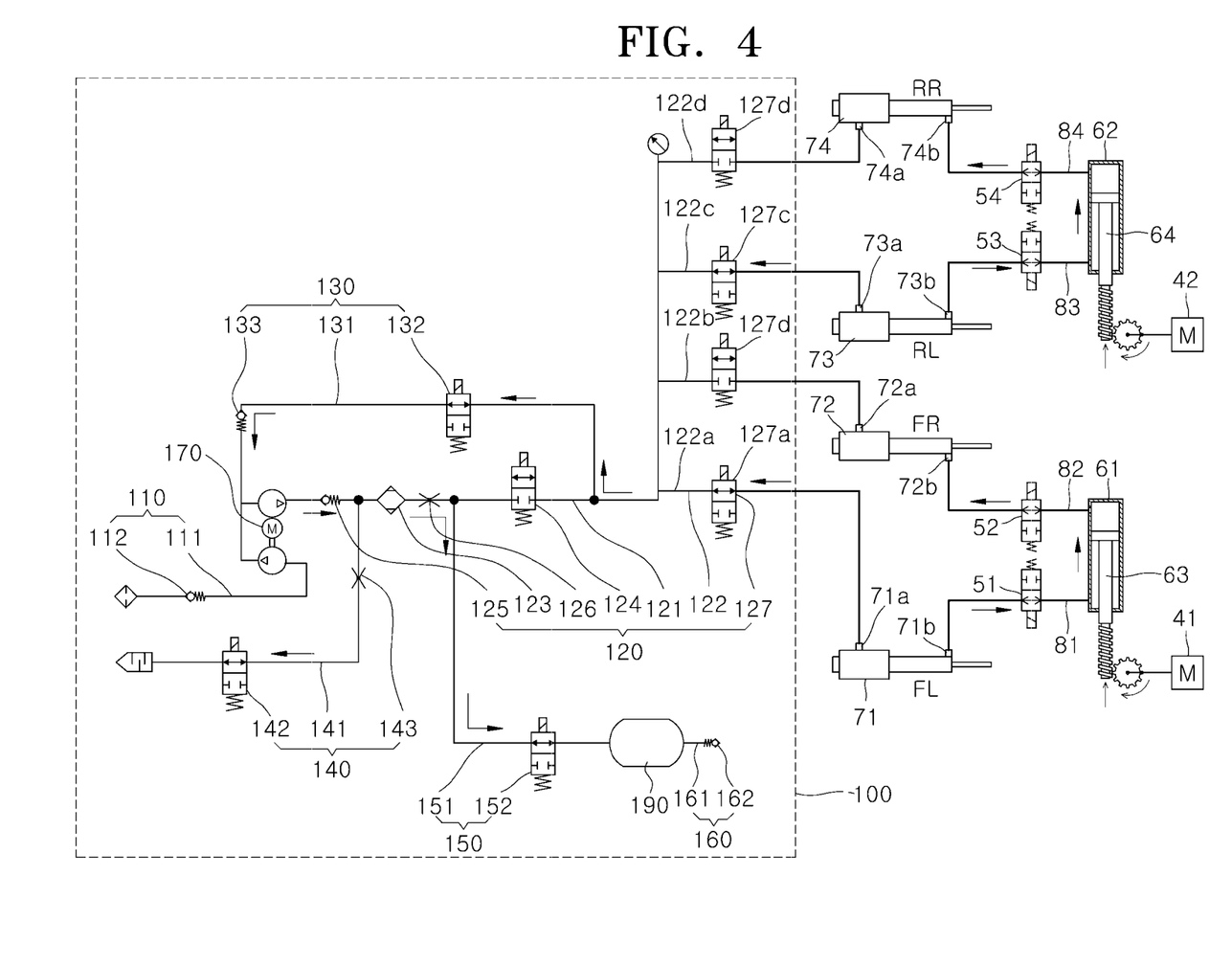
FIG. 4 is a diagram illustrating a state in which a left air spring is decompressed in the air suspension system according to the embodiment of the present invention.

FIG. 4 is a diagram illustrating a state in which the left air spring is decompressed in the air suspension system according to the embodiment of the present invention.

As illustrated in FIG. 4, an example will be described in which air pressure is guided to the storage tank to decompress the left air spring in the roll moment situation. The second spring valves 127a and 127c open the second branch pipes 122a and 122c, the third valve 132 opens the third pneumatic pipe 131, and the fifth valve 152 opens the fifth pneumatic pipe 151. When the compressor 170 is driven in this state, the air stored in the first and third air springs 71 and 73 reaches the compressor 170 through the third pneumatic pipe 131. The compressed air having passed through the compressor 170 is dehumidified while passing through the second dryer 123 and then stored in the storage tank 190. In this case, by removing the air from the first and third air springs 71 and 73, they may be decompressed and lowered.

In the case where the air pressure is guided to the outside, when, in the above state, the fifth valve 152 is closed and the compressor 170 is driven with the fourth pneumatic pipe 141 opened by the fourth valve 142, the air stored in the first and third air springs 71 and 73 reaches the compressor 170 through the third pneumatic pipe 131. The compressed air having passed through the compressor 170 is discharged to the outside through the fourth pneumatic pipe 141.

In addition, by opening the first to fourth solenoid valves 51, 52, 53, and 54 and moving the first piston rod 63 of the first double-acting cylinder 61 and the second piston rod 64 of the second double-acting cylinder 62 in the right direction, the air is removed from the first and third air springs 71 and 73 through the first and second left lines 81 and 83, thereby enabling the first and third air springs 71 and 73 to be decompressed.

Figure 5:
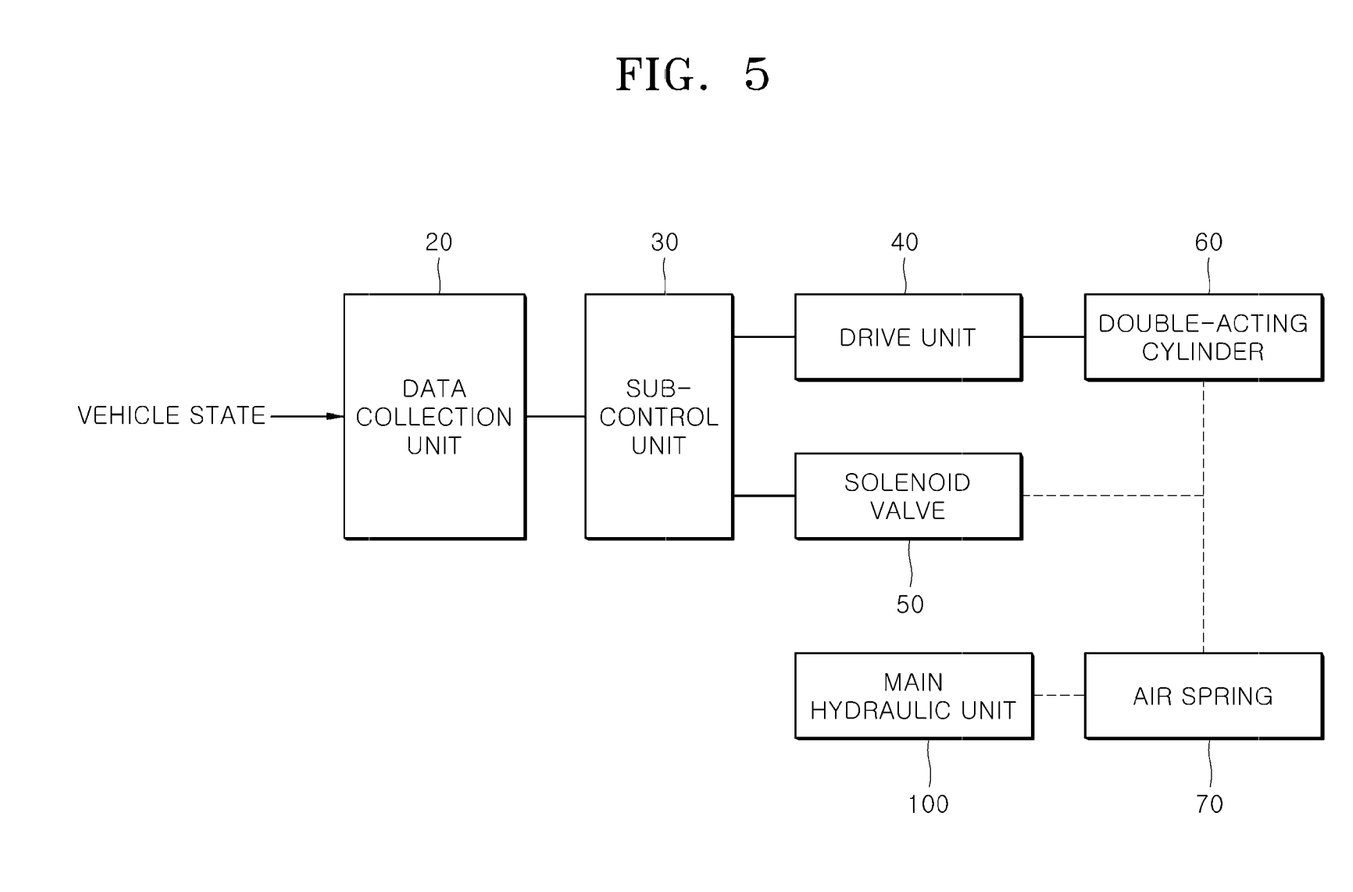
FIG. 5 is a block diagram illustrating an air suspension system according to another embodiment of the present invention.

FIG. 5 is a block diagram illustrating an air suspension system according to another embodiment of the present invention.

As illustrated in FIG. 5, the air suspension system may include an air spring 70, a data collection unit 20, a solenoid valve 50, a double-acting cylinder 60, a drive unit 40, and a sub-control unit 30.

The air spring 70 is a two-chamber air spring having two input ports, and may consist of first to fourth air springs 71 to 74 that are installed to respective left and right front and rear wheels of a vehicle. The first to fourth air springs 71 to 74 may be connected, at first input ports 71a to 74a thereof, to second branch pipes 122a, 122b, 122c, and 122d of a main hydraulic unit 100 for adjusting the flow of compressed air to adjust the height of the vehicle, thereby adjusting the heights of the left and right front and rear wheels of the vehicle according to the roll situation of the vehicle based on the compressed air.

The data collection unit 20 may collect a vehicle state from a vehicle controller to provide it to the sub-control unit 30.

Here, the vehicle state may include at least one of a steering angle, a vehicle speed, a roll angle, a roll moment, and a difference in vehicle left and right heights.

The solenoid valve 50 is a normally closed valve, and may consist of first to fourth solenoid valves 51 to 54 installed corresponding to the first to fourth air springs 71 to 74 so as to control the flow of compressed air additionally introduced into each of second input ports 71b to 74b of the first to fourth air springs 71 to 74.

The double-acting cylinder 60 may guide the flow of compressed air in left and right directions by bilateral movement of the piston rod thereof to supply the compressed air to each of the left and right air springs 70 through the solenoid valves 50 connected to the respective left and right of the double-acting cylinder 60.

The drive unit 40 may include a drive motor connected to the piston rod in a rack-pinion manner to bilaterally move the piston rod and adjust the inflow direction of the compressed air into the double-acting cylinder 60.

Figure 6:
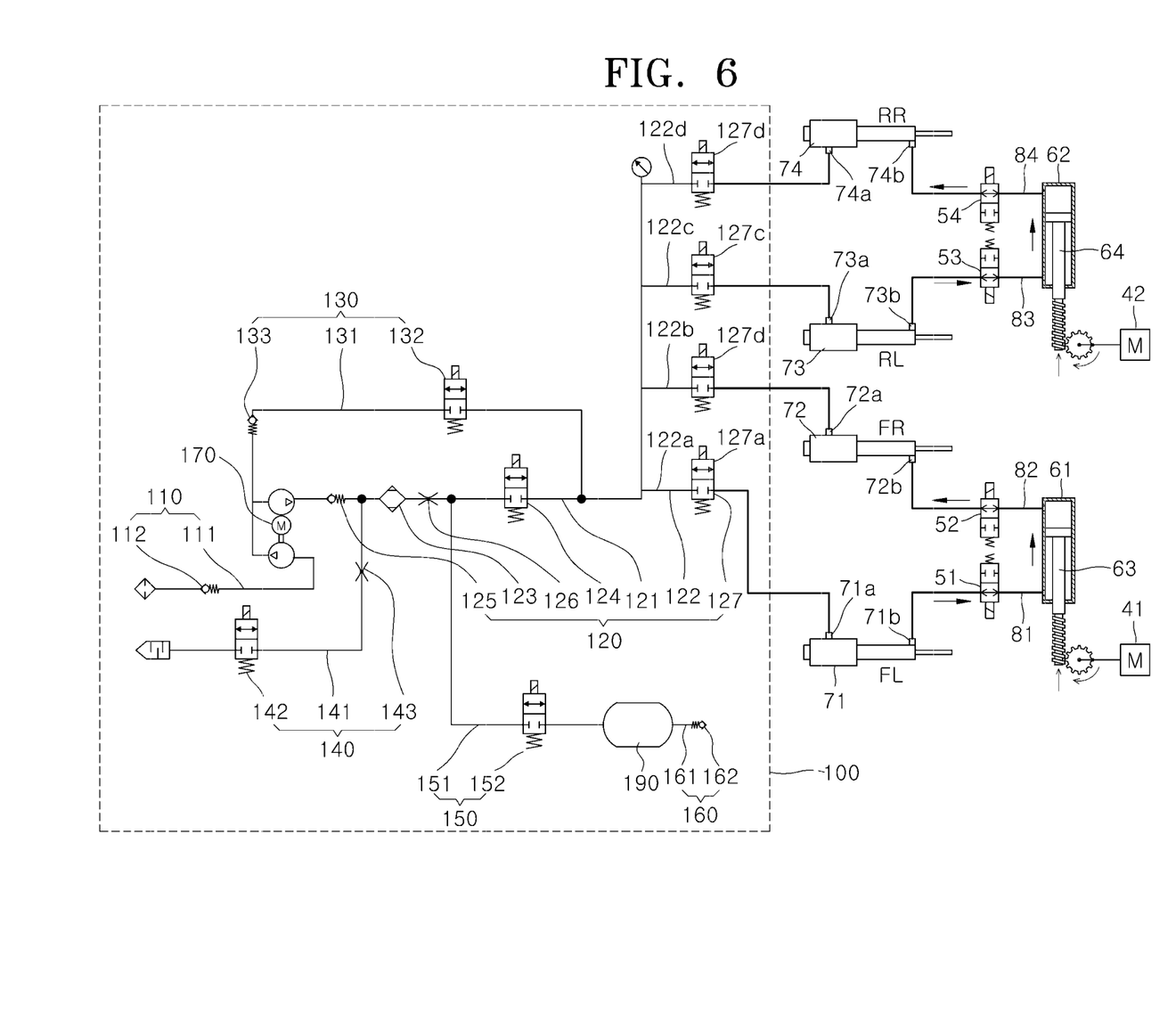
FIG. 6 is a diagram illustrating a state in which a right air spring is boosted and a left air spring is decompressed in the air suspension system according to another embodiment of the present invention.

Here, the double-acting cylinder 60 may include a first double-acting cylinder 61 for adjusting left and right front wheels and a second double-acting cylinder 62 for adjusting left and right rear wheels, as illustrated in FIG. 6.

The first double-acting cylinder 61 may supply the first solenoid valve 51, installed to the left front wheel, with the compressed air discharged in the left direction by left movement of a first piston rod 63 through a first left line 81 and supply the second solenoid valve 52, installed to the right front wheel, with the compressed air discharged in the right direction by right movement of the first piston rod 63 through a first right line 82, thereby additionally supplying the compressed air to each of the first and second air springs 71 and 72 installed to the respective left and right front wheels.

The second double-acting cylinder 62 may supply the third solenoid valve 53, installed to the left rear wheel, with the compressed air discharged in the left direction by left movement of a second piston rod 64 through a second left line 83 and supply the fourth solenoid valve 54, installed to the right rear wheel, with the compressed air discharged in the right direction by right movement of the second piston rod 64 through a second right line 84, thereby additionally supplying the compressed air to each of the third and fourth air springs 73 and 74 installed to the respective left and right rear wheels.

The sub-control unit 30 may operate the solenoid valve 50 and drive motors 41 and 42 of the drive unit 40 to control a sudden instantaneous change by intervening in a roll situation occurring during steering in connection with an electric steering device based on the vehicle state input from the data collection unit 20 and setting a driving position and driving acceleration for performing roll suppression.

In addition, the sub-control unit 30 may open the closed solenoid valve 50 only above a set roll moment, such as above an air spring actuation signal, thereby preventing a leakage of air by keeping the solenoid valve 50 closed in normal times.

FIG. 6 is a diagram illustrating a state in which the right air spring is boosted and the left air spring is decompressed in the air suspension system according to another embodiment of the present invention.

As illustrated in FIG. 6, an example will be described in which the right air spring is boosted and the left air spring is decompressed in the roll moment situation of the air suspension system. When the first to fourth solenoid valves 51, 52, 53, and 54 are opened and the first piston rod 63 of the first double-acting cylinder 61 and the second piston rod 64 of the second double-acting cylinder 62 are moved in the right direction, the compressed air may be supplied to the second and fourth air springs 72 and 74 through the first and second right lines 82 and 84, thereby enabling the second and fourth air springs 72 and 74 to be boosted. Also, the air may be removed from the first and third air springs 71 and 73 through the first and second left lines 81 and 83, thereby enabling the first and third air springs 71 and 73 to be decompressed.

As described above, in the air suspension system according to the embodiments of the present invention, it is possible to improve a roll suppression effect and control a sudden instantaneous change by adding, to the main hydraulic unit, the sub-hydraulic unit, which interlocks with the control operation of the main hydraulic unit or electrically regulates the pressure of the air spring in the roll moment situation independently of the main hydraulic unit to enhance responsiveness thereof. Thus, it is possible not only to improve the steering stability and riding comfort of the vehicle but also to distribute the operating load by the main hydraulic unit and the sub-hydraulic unit, thereby extending the operating range of the air suspension system.

Figure 7:
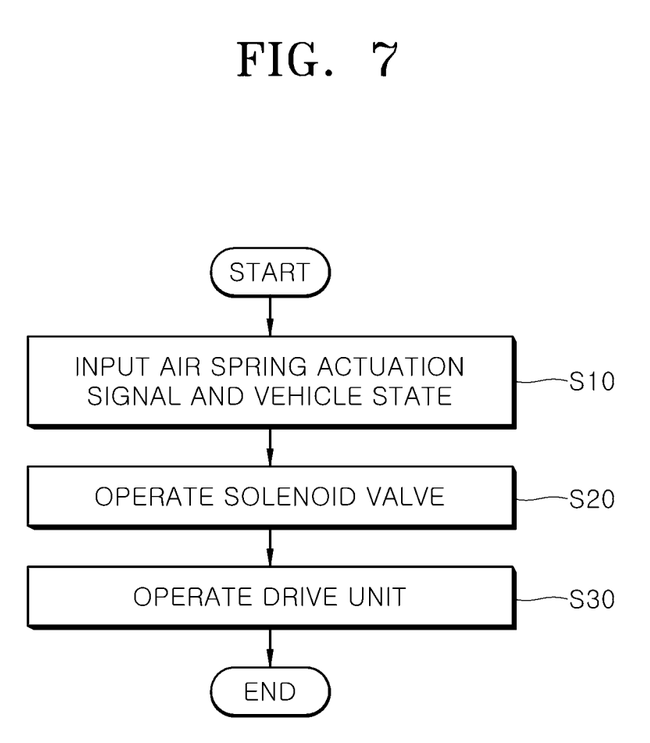
FIG. 7 is a flowchart illustrating a method of controlling an air suspension system according to an embodiment of the present invention.

FIG. 7 is a flowchart illustrating a method of controlling an air suspension system according to an embodiment of the present invention.

As illustrated in FIG. 7, in the method of controlling an air suspension system according to the embodiment of the present invention, a sub-control unit 30 first receives at least one of an air spring actuation signal collected from a main control unit 90 and a vehicle state collected from a vehicle controller through a data collection unit 20 (S10).

Here, the air spring actuation signal collected from the main control unit 90 is generated to perform roll suppression by intervening in a roll situation occurring during steering in connection with an electric steering device based on the vehicle state input from the vehicle controller.

In addition, the vehicle state may include at least one of a steering angle, a vehicle speed, a roll angle, a roll moment, and a difference in vehicle left and right heights.

In this case, the sub-control unit 30 may also generate an actuation signal for operating a drive unit 40 and a solenoid valve 50 by intervening in a roll situation occurring during steering in connection with an electric steering device independently based on the vehicle state input from the data collection unit 20 and setting a driving position and driving acceleration for performing roll suppression.

In step S10, the sub-control unit 30 operates the solenoid valve 50 to control the flow of compressed air additionally introduced into each of air springs 70 installed to respective left and right front and rear wheels of the vehicle according to at least one of the air spring actuation signal and vehicle state input thereto (S20).

Here, the solenoid valve 50 may consist of first to fourth solenoid valves 51 to 54 installed corresponding to first to fourth air springs 71 to 74 so as to control the flow of compressed air additionally introduced into each of second input ports 71b to 74b of the first to fourth air springs 71 to 74.

In addition, the sub-control unit 30 may open the closed solenoid valve 50 only above a set roll moment, such as above an air spring actuation signal, thereby preventing a leakage of air by keeping the solenoid valve 50 closed in normal times.

In step S20, after the solenoid valve 50 is operated, the sub-control unit 30 may operate the drive unit 40 that bilaterally moves a piston rod to guide the flow of compressed air in left and right directions in a double-acting cylinder 60 and supply the compressed air to the solenoid valve 50, thereby compensating for the slow responsiveness of a main hydraulic unit 100 due to the pneumatic characteristics thereof and controlling a sudden instantaneous change through drive motors 41 and 42 of the drive unit 40 (S30).

As described above, in the method of controlling an air suspension system according to the embodiment of the present invention, it is possible to improve a roll suppression effect and control a sudden instantaneous change by adding, to the main hydraulic unit, the sub-hydraulic unit, which interlocks with the control operation of the main hydraulic unit or electrically regulates the pressure of the air spring in the roll moment situation independently of the main hydraulic unit to enhance responsiveness thereof. Thus, it is possible not only to improve the steering stability and riding comfort of the vehicle but also to distribute the operating load by the main hydraulic unit and the sub-hydraulic unit, thereby extending the operating range of the air suspension system.

While various embodiments have been described above, it will be understood by those skilled in the art that the embodiments described herein are by way of example only. It will be apparent to those skilled in the art that various modifications and other equivalent embodiments may be made without departing from the spirit and scope of the disclosure.

Accordingly, the true technical protection scope of the invention should be defined by the appended claims.

Although exemplary embodiments of the present disclosure have been shown and described hereinabove, the present disclosure is not limited to specific exemplary embodiments described above, but may be various modified by those skilled in the art to which the present disclosure pertains without departing from the scope and spirit of the disclosure as disclosed in the accompanying claims. In addition, such modifications should also be understood to fall within the scope and spirit of the present disclosure.

What is claimed is:

1. An air suspension system comprising:
   air springs, each having a first input port connected to a main hydraulic unit configured to regulate a flow of compressed air and adjust a vehicle height according to a roll situation of a vehicle, the air springs adjusting heights of left and right front and rear wheels of the vehicle based on the compressed air;
   a data collection unit configured to receive data regarding a vehicle state from a vehicle controller;
   a solenoid valve configured to control the flow of the compressed air additionally introduced into a second input port of each of the air springs;
   a double-acting cylinder including a piston rod configured to bilaterally move to guide the flow of the compressed air in left and right directions, so that the compressed air is individually supplied to the left and right air springs through the solenoid valves connected to respective left and right sides of the double-acting cylinder;
   a drive unit including a drive motor configured to bilaterally move the piston rod; and
   a sub-control unit configured to determine a roll moment situation and set a driving position and driving acceleration, based on the data regarding a vehicle state received by the data collection unit, and to operate the solenoid valve and the drive unit.

2. The air suspension system according to claim 1, wherein each of the air springs comprises a two-chamber air spring having the first and second input ports.

3. The air suspension system according to claim 1, wherein the vehicle state comprises at least one of a steering angle, a vehicle speed, a roll angle, a roll moment, and a difference in vehicle left and right heights.

4. The air suspension system according to claim 1, wherein the data collection unit is further configured to input an air spring actuation signal from a main control unit, and the sub-control unit is configured to operate the solenoid valve and the drive unit according to at least one of the air spring actuation signal and the data regarding a vehicle state received by the data collection unit.

5. The air suspension system according to claim 1, wherein the drive motor of the drive unit is connected to the piston rod in a rack-pinion arrangement.

6. The air suspension system according to claim 1, wherein the double-acting cylinder comprises:
   a first double-acting cylinder configured to supply the compressed air to first and second solenoid valves that control the compressed air additionally introduced to first and second air springs installed to the respective left and right front wheels; and
   a second double-acting cylinder configured to supply the compressed air to third and fourth solenoid valves that control the compressed air additionally introduced to third and fourth air springs installed to the respective left and right rear wheels.

7. The air suspension system according to claim 6, wherein the first double-acting cylinder comprises:
   a first left line through which the compressed air discharged in the left direction by left movement of a first piston rod is supplied to the first solenoid valve installed to the left front wheel; and
   a first right line through which the compressed air discharged in the right direction by right movement of the first piston rod is supplied to the second solenoid valve installed to the right front wheel.

8. The air suspension system according to claim 6, wherein the second double-acting cylinder comprises:
   a second left line through which the compressed air discharged in the left direction by left movement of a second piston rod is supplied to the third solenoid valve installed to the left rear wheel; and
   a second right line through which the compressed air discharged in the right direction by right movement of the second piston rod is supplied to the fourth solenoid valve installed to the right rear wheel.

9. The air suspension system according to claim 1, wherein the solenoid valve is a normally closed valve.

10. A method of controlling an air suspension system, comprising:
    receiving, by a sub-control unit, at least one of an air spring actuation signal received from a main control unit and data regarding a vehicle state received from a vehicle controller through a data collection unit;
    operating, by the sub-control unit, a solenoid valve to control a flow of compressed air additionally introduced into each of air springs installed to respective left and right front and rear wheels of a vehicle according to at least one of the air spring actuation signal and the vehicle state; and
    operating, by the sub-control unit, a drive unit after operating the solenoid valve, so that the drive unit bilaterally moves a piston rod to guide the flow of compressed air in left and right directions in a double-acting cylinder and supply the compressed air to the solenoid valve.

11. The method according to claim 10, wherein in the operating, by the sub-control unit, a solenoid valve, the sub-control unit opens the closed solenoid valve in response to the air spring actuation signal.

12. The method according to claim 10, wherein the vehicle state comprises at least one of a steering angle, a vehicle speed, a roll angle, a roll moment, and a difference in vehicle left and right heights.

13. The method according to claim 10, wherein in the operating, by the sub-control unit, a drive unit, the sub-control unit operates the drive unit by setting a driving position and driving acceleration according to the vehicle state.

* * * * *